United States Patent [19]

Shekleton

[11] Patent Number: 5,177,955
[45] Date of Patent: Jan. 12, 1993

[54] DUAL ZONE SINGLE MANIFOLD FUEL INJECTION SYSTEM

[75] Inventor: Jack R. Shekleton, San Diego, Calif.

[73] Assignee: Sundstrand Corp., Rockford, Ill.

[21] Appl. No.: 652,009

[22] Filed: Feb. 7, 1991

[51] Int. Cl.⁵ .............................. F23R 3/06; F02C 3/24
[52] U.S. Cl. ...................................... 60/39.36; 60/738;
60/739; 60/746
[58] Field of Search ................. 60/39.36, 39.75, 39.83,
60/737–740, 743, 746, 755, 756, 758, 760;
431/354; 239/418, 432, 433, 434

[56] References Cited

U.S. PATENT DOCUMENTS

| | | | |
|---|---|---|---|
| 2,902,823 | 9/1959 | Wagner | 60/746 |
| 3,099,134 | 7/1963 | Calder et al. | 60/747 |
| 3,719,042 | 3/1973 | Chamberlain | 60/739 |
| 3,871,063 | 3/1975 | Halvorsen . | |
| 4,018,043 | 4/1977 | Clemmens | 60/760 |
| 4,794,754 | 1/1989 | Shekleton et al. | 60/39.36 |
| 4,862,693 | 9/1989 | Batakis et al. | 60/739 |
| 4,891,936 | 1/1990 | Shekleton et al. | 60/39.36 |
| 5,033,263 | 7/1991 | Shekleton et al. | 60/39.36 |

Primary Examiner—Louis J. Casaregola
Assistant Examiner—Timothy S. Thorpe
Attorney, Agent, or Firm—Wood, Phillips, Van Santen, Hoffman & Ertel

[57] ABSTRACT

In order to provide a simple, low-cost fuel injection system, particularly for a dual zoned annular combustor (10), a single fuel manifold (42) is utilized having first and second manifold portions (42a and 42b) each with a respective plurality of openings (44a and 44b) through which fuel may flow into first and second fuel injection zones (34 and 36). The annular combustor (10) typically includes a combustor housing (12) comprising an axially extending sleeve (14) disposed about a longitudinally extending axis (16) and an annular liner (18) defining a combustion chamber (26) and being spaced from the housing (12) and the sleeve (14) to form a compressed air flow path (28) therebetween. By providing a plurality of circumferentially spaced openings (38and40) through an outer wall (22) of the liner (18) in each of a pair of axially spaced planes so as to be in communication with the first and second fuel injection zones (34and 36), the first and second manifold portions (42a and 42b) are operative to inject fuel through the liner (18) so that it enters the combustion chamber (26) in a generally tangential direction into the first duel injection zone (34) axially adjacent a radially extending wall (24) of the liner (18) and into the second fuel injection zone (36) axially adjacent the first fuel injection zone (34).

16 Claims, 3 Drawing Sheets

DUAL ZONE SINGLE MANIFOLD FUEL INJECTION SYSTEM

FIELD OF THE INVENTION

The present invention is directed to a manifold fuel injection system and, more particularly, an annular combustor having manifold fuel injection.

BACKGROUND OF THE INVENTION

Most relatively small missiles in use today are propelled by solid fuel rockets as opposed to, for example, turbine engines. The selection of a solid fuel rocket as a propulsion device has been largely dictated by two factors. First, in many instances, a turbine engine cannot be fabricated sufficiently economically as to compete with a solid fuel rocket engine. Secondly, in small sized missiles, i.e., those having relatively small diameters on the order of about four inches, it has heretofore been quite difficult to manufacture an efficient turbine engine. The difficulty lies in the fact that the turbine engine must fit within the four inch envelope required of the propulsion unit for such a missile. Unfortunately, the use of solid fuel rocket engines has had consequences that are not entirely desirable in many applications.

Specifically, the use of solid fuel rocket engines results in the loss of some degree of control of the missile flight path or trajectory. In contrast, control is far greater with gas turbine engines whose output can readily be varied. Further, even if the gas turbine engine operates relatively inefficiently, the use of such an engine would greatly extend the range of the missile.

As will be appreciated, one of the difficulties in economically producing small diameter gas turbine engines resides in the labor intensive nature of the manufacture of the combustor. Furthermore, as combustor sizes shrink so as to fit within some desired envelope, the difficulty in achieving efficient combustion of fuel rises significantly. In particular, as the size or volume of a combustor is reduced, there may be insufficient volume to allow the fuel to first be vaporized completely, burned efficiently, and then mixed uniformly.

In order to overcome the foregoing, a unique low cost annular combustor was developed as disclosed in commonly owned U.S. Pat. No. 4,794,754, issued Jan. 3, 1989. This annular combustor has proven to be well suited for its intended purpose, but it was desired to attempt to achieve greater performance characteristics with a higher turbine inlet temperature while meeting the necessary size constraints and achieving the goal of simplicity coupled with ultralow cost for throw away missile applications. For this purpose, it was recognized that a new approach would be required to completely reach the necessary parameters of operation.

In order to achieve these objectives, a combustor having enhanced turbine nozzle cooling was developed as disclosed in commonly owned U.S. Pat. No. 4,825,640, issued May 2, 1989. And as a further improvement in this field, an inexpensive annular combustor promoting both full and efficient vaporization and combustion along with thorough mixing for uniform exit temperatures was developed. More specifically, such a combustor is disclosed in commonly owned and co-pending patent application U.S. Ser. No. 455,588, filed Dec. 22, 1989.

While all of these represent significant advancements in the field, it is believed that still further enhanced operating parameters are capable of being achieved. Accordingly, the present invention is directed to still more fully overcoming the foregoing problems while achieving this objective to the fullest extent possible.

SUMMARY OF THE INVENTION

It is the principal object of the present invention to provide a new and improved annular combustor for a turbine engine. It is a further object of the present invention to provide an annular combustor characterized by meeting necessary performance parameters while utilizing an inexpensive construction in a dual fuel injection zone system. It is an additional object of the present invention to provide an annular combustor having dual manifold fuel injection utilized therein.

In an exemplary embodiment of an annular combustor for a turbine engine in accordance with the present invention, the combustor comprises a combustor housing including an axially extending sleeve disposed about a longitudinally extending axis and an annular liner disposed within the housing and about the sleeve. The liner has concentric inner and outer axially elongated walls spaced from the sleeve and the housing, respectively. It also has a radially extending wall spaced from the housing and interconnecting the inner and outer walls at one end to define a combustion chamber. The liner is disposed in spaced relation to the housing and the sleeve to define a compressed air flow path therebetween. Further, the combustor includes means for injecting fuel through the liner in a generally tangential direction into a first fuel injection zone axially adjacent the radially extending wall and into a second fuel injection zone axially adjacent the first fuel injection zone.

As for the fuel injecting means, it includes a plurality of circumferentially spaced openings through the outer wall of the liner in each of a pair of axially spaced planes generally perpendicular to the longitudinally extending axis in communication with the first and second fuel injection zones, respectively. More specifically, the fuel injection means includes a single fuel manifold in the compressed air flow path having first and second manifold portions each with a respective plurality of openings through which fuel may flow into the first and second fuel injection zones, respectively.

In one embodiment, the openings through the outer wall of the liner are defined by a plurality of open ended elongated air blast tubes adjacent the fuel manifold. In particular, the tubes are adjacent each of the first and second manifold portions and are directed generally tangential to the first and second fuel injection zones, respectively. Further, the tubes are disposed in the axially spaced planes with each having an opening for receiving fuel flowing through the corresponding one of the openings in the fuel manifold.

Advantageously, the air blast tubes each have one end located between the outer wall and the housing in communication with the compressed air flow path and the other end located within the combustion chamber. The fuel receiving opening in each of the tubes preferably comprises a generally radially extending opening in a wall thereof. Still more specifically, the openings each comprise a fuel metering orifice dimensioned smaller than the opening in the wall of the corresponding one of the tubes but radially aligned therewith.

In another embodiment, the openings through the outer wall of the liner are advantageously defined by a plurality of bent tabs which are formed from discrete portions of the outer wall adjacent the location of the fuel manifold. The bent tabs forming the openings adjacent each of the first and second manifold portions are directed generally tangentially of the first and second fuel injection zones, respectively. Preferably, the bent tabs are disposed in the axially spaced planes such that each of the openings through the outer wall is adapted to receive fuel flowing through the corresponding one of the openings in the fuel manifold.

In either embodiment, the fuel manifold preferably includes a fuel inlet line leading from a source of fuel to the first fuel manifold portion. The first fuel manifold portion is advantageously generally circular and radially dimensioned for positioning within the compressed air flow path. Further, the fuel manifold includes a connecting branch leading from the first fuel manifold portion to the second fuel manifold portion. The second manifold portion is also advantageously generally circular and radially dimensioned for positioning within the compressed air flow path. With this arrangement, the openings in the fuel manifold are preferably limited to the first and second fuel manifold portions only.

In a highly preferred embodiment, the fuel manifold is generally elliptical in cross-section with the openings in the first and second fuel manifold portions being disposed along a major axis thereof. Still additionally, means may suitably be provided for securing the air blast tubes and the fuel manifold to the outer wall of the liner at a point within the compressed air flow path.

As for details of the combustor, the compressed air flow path preferably extends from a radially outer compressed air inlet in communication with a source of compressed air to a radially inner compressed air outlet in communication with the combustion chamber. The combustor advantageously includes a plurality of circumferentially spaced open ended elongated dilution air tubes extending through the outer wall adjacent the compressed air inlet. The compressed air inlet is preferably axially remote from the radially extending wall. The combustor is advantageously formed such that the dilution air tubes are directed generally toward a combustor outlet at the end of the combustion chamber remote from the radially extending wall. With this arrangement, it will be appreciated that the dilution air tubes are adapted to provide dilution air at a point upstream of a turbine nozzle and downstream of the first and second fuel injection zones for mixing with the hot gases of combustion.

As for the bent tab embodiment, the openings in the outer wall of the liner preferably have a greater length dimension than width dimension. The bent tabs may then be integrally formed from portions of the outer wall of the liner which also have a greater length dimension than width dimension. Preferably, the bent tabs are disposed at an acute angle to the outer wall of the liner to control the angle of the generally tangential fuel injection.

Still further, the compressor is suitably adapted to deliver swirl air to the compressed air flow path wherein the swirl air is such as to have a swirl angle of greater than 30° and less than 90° in a most highly preferred embodiment of the present invention. With such swirl air, the openings in the first and second fuel manifold portions are advantageously arranged to direct fuel generally perpendicular to the direction of travel of the swirl air and of the length dimension of the openings in the outer wall of the liner.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
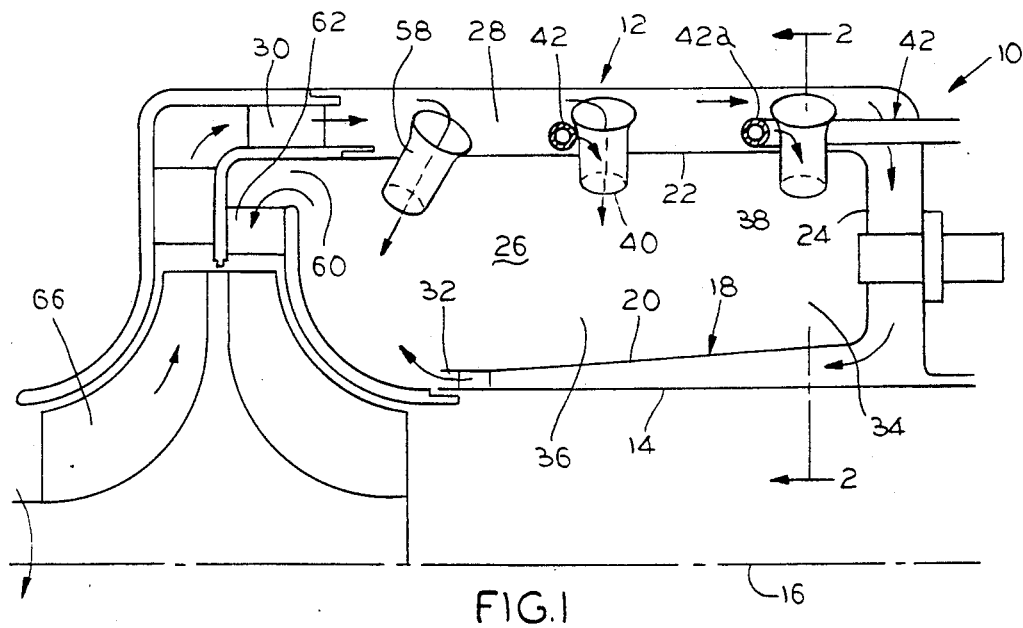
FIG. 1 is a cross-sectional view of an annular combustor for a turbine engine generally in accordance with the present invention.

Referring to the drawings, and first to FIG. 1, the reference numeral 10 designates generally an annular combustor for a turbine engine in accordance with the present invention. The combustor 10 comprises a combustor housing 12 including an axially extending sleeve 14 disposed about a longitudinally extending axis 16 and an annular liner generally designated 18 disposed within the housing 12 and about the sleeve 14. The liner 18 has concentric inner and outer axially elongated walls 20 and 22 spaced from the sleeve 14 and housing 12, respectively, and also has a radially extending wall 24 spaced from the housing 12 and interconnecting the inner and outer walls 20 and 22 at one end to define a combustion chamber 26. The liner 18 is spaced from the housing 12 and the sleeve 14 to define a compressed air flow path 28 extending from a radially outer compressed air inlet 30 in communication with a source of compressed air to a radially inner compressed air outlet 32 in communication with the combustion chamber 26 at a point axially remote from the radially extending wall 24. The combustor 10 also includes means for injecting fuel through the liner 18 in a generally tangential direction into a first or primary fuel injection or flame zone axially adjacent the radially extending wall 24 and into a second or secondary fuel injection or flame zone 36 axially adjacent the first or primary zone 34. More specifically, the fuel injecting means includes a plurality of circumferentially spaced openings 38 and 40 together with a single fuel manifold 42.

Referring now to FIGS. 1 through 4, the circumferentially spaced openings 38 and 40 extend through the outer wall 22 of the liner 18 in each of a pair of axially spaced planes generally perpendicular to the longitudinally extending axis 16 so as to be in direct communication with the first and second fuel injection zones 34 and 36, respectively. As also shown in FIGS. 1 through 4, the fuel manifold 42 is disposed in the compressed air flow path 28 where it has first and second manifold portions 42a and 42b each of which has a respective plurality of openings 44a and 44b through which fuel may flow from the fuel manifold 42 into the first and second fuel injection zones 34 and 36, respectively.

Figure 2:
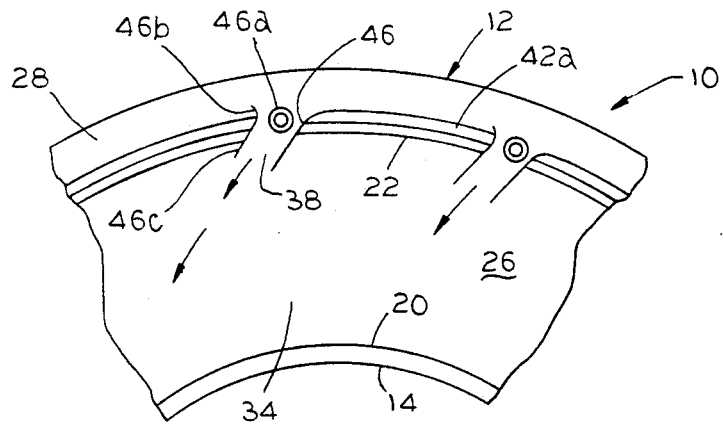
FIG. 2 is a cross-sectional view taken on the line 2—2 of FIG. 1.
Figure 3:
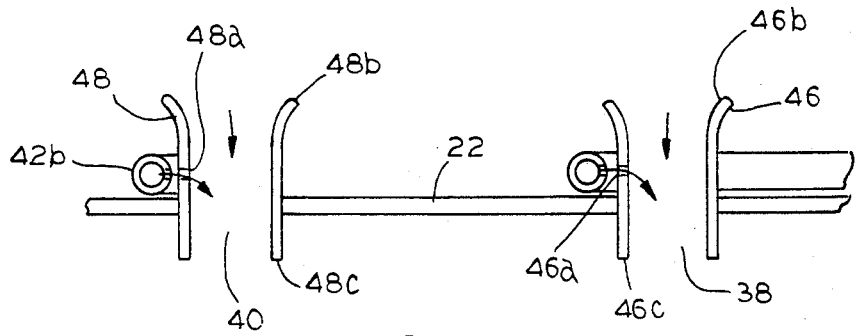
FIG. 3 is an enlarged cross-sectional view of a dual manifold fuel injection system generally in accordance with the present invention.

Referring specifically to FIGS. 1 through 3, the openings 38 and 40 through the outer wall 22 of the liner 18 are defined by a plurality of open ended elongated tubes 46 and 48 adjacent the fuel manifold 42. In particular, the tubes 46 and 48, respectively, are adjacent the first and second manifold portions 42a and 42b, respectively, and are directed generally tangentially (see FIG. 2) of the first and second fuel injection zones 34 and 36, respectively. Moreover, the tubes 46 and 48 are disposed in the previously mentioned axially spaced planes such that each of the tubes 46 and 48 has an opening 46a and 48a for receiving fuel flowing through the corresponding one of the openings 44a and 44b in the fuel manifold 42.

As best shown in FIGS. 2 and 3, the tubes 46 and 48 each have one end 46b and 48b located between the outer wall 22 and the housing 12 in communication with the compressed air flow path 28 and the other end 46c and 48c located within the combustion chamber 26. The respective openings 46a and 48a in each of the tubes 46 and 48 will also be seen to comprise a generally radially extending opening in what will be understood to comprise a cylindrical wall thereof. In this connection, the openings 44a and 44b comprise fuel metering orifices dimensioned smaller than the openings 46a and 48a and arranged so as to be radially aligned with the openings 46a and 48a in the corresponding one of the tubes 46 and 48.

Figure 4:
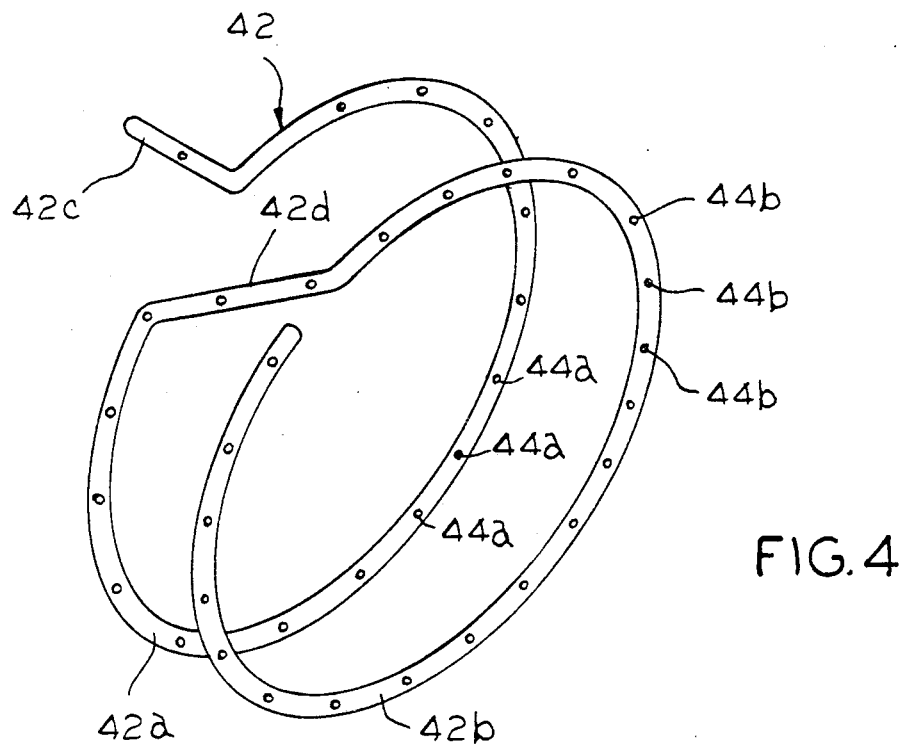
FIG. 4 is a perspective view of a fuel manifold of the type illustrated in FIG. 3.

Referring now to FIG. 4, the fuel manifold 42 includes a fuel inlet line 42c leading from a source of fuel to the first fuel manifold portion 42a. The first fuel manifold portion 42a is generally circular and radially dimensioned for positioning within the compressed air flow path 28. The fuel manifold 42 also includes a connecting branch 42d leading from the first fuel manifold portion 42a to the second manifold portion 42b. The second manifold portion 42b is also generally circular and radially dimensioned for positioning within the compressed air flow path 28. As will be appreciated, the openings 44a and 44b in the fuel manifold 42 are limited to the first and second fuel manifold portions 42a and 42b only.

Figure 5:
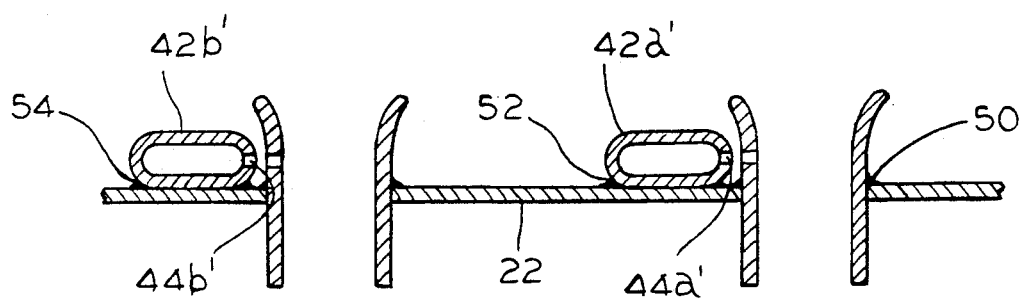
FIG. 5 is a cross-sectional view illustrating another form of fuel manifold generally in accordance with the present invention.
Figure 6:
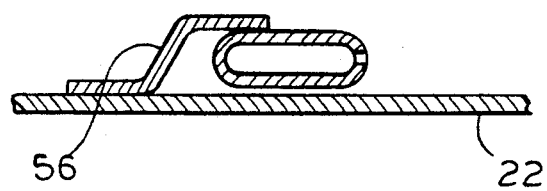
FIG. 6 is a cross-sectional view illustrating another form of mounting a fuel manifold in accordance with the present invention.

Referring now to FIGS. 5 and 6, it will be appreciated that a fuel manifold 42' may be formed generally elliptical in cross section with the openings 44a' and 44b' in the first and second fuel manifold portions 42a' and 42b' being disposed along a major axis thereof. This will avoid potentially significant air flow disruption and consequent pressure loss from high velocity air flowing through the compressed air flow path 28, particularly where space is limited between the outer wall 22 of the liner 18 and the housing 12. By utilizing the configuration illustrated in FIG. 5, the fuel manifold 42' has the necessary cross-sectional area, aerodynamic disruption is minimized, and the fuel metering orifices 44a' and 44b' can be maintained sufficiently large for discharging fuel therethrough.

As a result, the fuel manifold 42' will have lower fuel pressure loss which follows from the large cross-sectional area and sufficiently large fuel metering orifices 44a' and 44b'. Significantly, this is accomplished in a manner which substantially entirely avoids significant flow maldistributions as between the multiplicity of fuel metering orifices 44a' and 44b'.

Still referring to FIGS. 5 and 6, the tubes 46 and 48 and the fuel manifold 42 will be secured to the outer wall 22 of the liner 18 at a point within the compressed air flow path 28 between the outer wall 22 of the liner 18 and the housing 12. As shown in FIG. 5, this may be accomplished by means such as brazing or tack welding of the tubes such as at 50 and of the manifold 42 as at 52 and 54 or, alternatively, tabs 56 may be utilized to secure the fuel manifold 42 to the outer wall 22 of the liner 18 (see FIG. 6).

As for the embodiment illustrated in FIG. 6, the tabs 56 are particularly suitable where longer life is considered desirable thus justifying more costly attachment means. The tabs 56 will be understood to provide an excellent thermal isolation between the outer wall 22 of the liner 18 and the fuel manifold 42. Because of the thermal isolation between the outer wall 22 of the liner 18 and the fuel manifold 42, differential expansion is accommodated between these respective components.

Referring again to FIG. 1, the combustor 10 may advantageously include a plurality of circumferentially spaced open ended elongated dilution air tubes 58 extending through the outer wall 22 adjacent the compressed air inlet 30. The dilution air tubes 58 are preferably directed generally toward a combustor outlet 60 which is located at the end of the combustion chamber 26 remote from the radially extending wall 24. In this connection, the dilution air tubes 58 are adapted to provide dilution air at a point upstream of a turbine nozzle 62 and downstream of the first and second fuel injection zones or flame zones 34 and 36, respectively.

Figure 7:
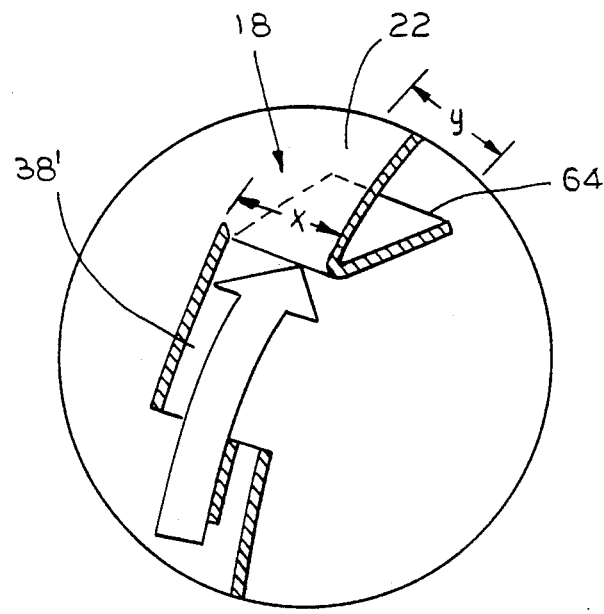
FIG. 7 is a perspective view illustrating an alternate opening for a manifold fuel injection system.
Figure 8:
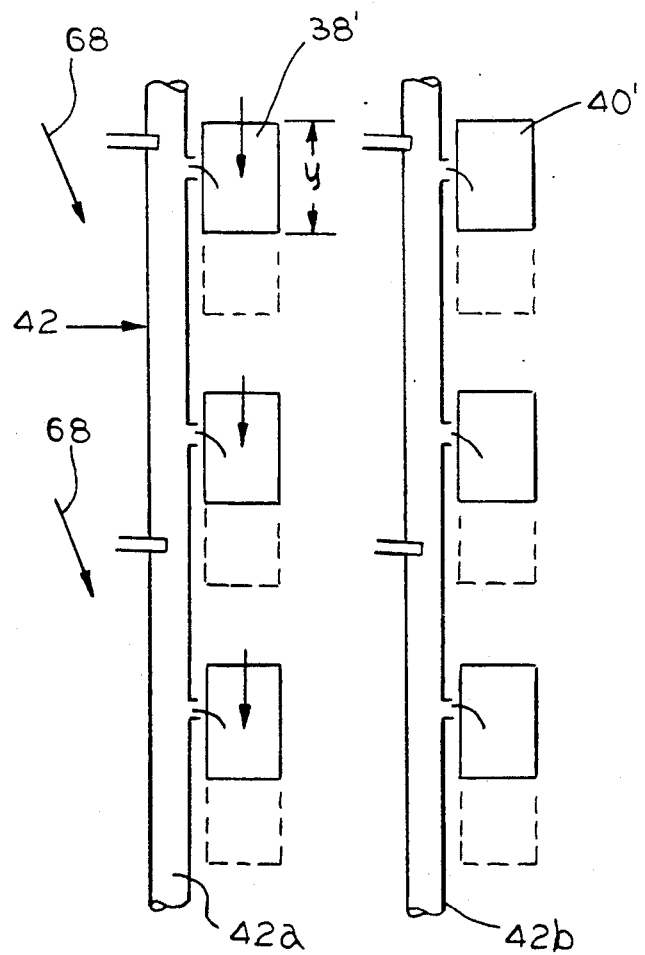
FIG. 8 is a somewhat schematic plan view of the manifold fuel injection system of the type illustrated in FIG. 7.

Referring now to FIGS. 7 and 8, the openings 38' and 40' through the outer wall 22 of the liner 18 may advantageously be defined by a plurality of bent tabs 64 integrally formed from portions of the outer wall 22 adjacent the fuel manifold 42. The bent tabs 64 adjacent each of the first and second manifold portions 42a and 42b are preferably directed generally tangentially of the first and second fuel injection zones or flame zones 34 and 36, respectively. Further, the bent tabs 64 are preferably disposed in the previously mentioned axially spaced planes with each of the openings 38' and 40' being adapted to receive fuel flowing through the corresponding one of the openings 44a and 44b in the fuel manifold 42.

As will be appreciated from FIG. 7, the openings such as 38' and 40' in the outer wall 22 of the liner 18 advantageously have a greater length dimension "Y" than width dimension "X". The bent tabs 64 formed from portions of the outer wall 22 of the liner 18 thus also have a greater length dimension "L" than width dimension "W". As also shown in FIG. 7, the bent tabs 64 are disposed at an acute angle Θ to the outer wall 22 of the liner 18 to control the angle of the generally tangential fuel injection.

Comparing FIGS. 1, 7 and 8, the combustor 10 preferably includes a compressor 66 adapted to deliver swirl air to the compressed air flow path 28 having a swirl angle of greater (and preferably much greater) than 30° but less than 90°. Thus, swirl air will be directed relative to the openings 38' and 40' as generally represented by the arrows 68 in FIG. 8, i.e., to have a very high circumferential directional component as compared to its axial directional component. As also shown in FIG. 8, the fuel metering orifices 44a and 44b direct fuel generally perpendicular to the length dimension "Y" of the openings 38' and 40' and generally perpendicular to the direction of travel of the swirl air as represented by the arrows 68.

For a typical radial compressor 66, there is a normally very high circumferential swirl of air approaching the radially outer compressed air inlet 30. Generally, deswirl vanes are used to reduce this angle to a range of 30° more or less, but it is advantageous to significantly increase the swirl of air, as shown in FIGS. 7 and 8, where the air is shown flowing essentially completely tangential. Of course, this high swirl may be achieved by shortening or eliminating any deswirl vanes which further reduces cost.

At the same time, external convective cooling of the combustor 26 is improved because of the higher air velocities involved which means that the need for additional expensive cooling as by conventional air film cooling techniques and the like is obviated. Also, while such higher air velocities are ordinarily associated with high pressure losses, this is not the case in the illustrated embodiment. Because the flow of air is nearly tangential, dynamic pressure is conserved in the turbine nozzle 62 through the principal of conservation of angular momentum and such potential losses in pressure are minimized.

Furthermore, the higher air velocities improve fuel atomization, fuel evaporation and fuel/air mixing which is particularly advantageous in very small combustors since the available time for these to occur is far shorter.

With regard to the location of the fuel manifold relative to the openings 38 or 38' and 40 or 40', the first and second manifold portions have been illustrated on the upstream side thereof. This is not believed to be critical, however, inasmuch as the first and second manifold portions could be located on the downstream side of the openings 38 or 38' and 40 or 40' or, alternatively, one could be upstream while the other was downstream. In any event, this and other details of construction are believed to be will within the skill of those in the art and, as such, need not be described in detail herein.

While in the foregoing there have been set forth preferred embodiments of the invention for purposes of illustration, it will be appreciated that the details herein given may be varied by those skilled in the art without departing from the true spirit and scope of the appended claims.

I claim:

1. An annular combustor for a turbine engine, comprising:
    a combustor housing including an axially extending sleeve disposed about a longitudinally extending axis;
    an annular liner disposed within said housing and about said sleeve and having concentric inner and outer axially elongated walls, said inner and outer walls being spaced from said sleeve and said housing, respectively, said liner also having a radially extending wall spaced from said housing and interconnecting said inner and outer walls at one end to define a combustion chamber;
    said liner being spaced from said housing and said sleeve to define a compressed air flow path therebetween;
    means for injecting fuel through said liner in a generally tangential direction into a first fuel injection zone axially adjacent said radially extending wall and into a second fuel injection zone axially adjacent said first fuel injection zone, said fuel injecting means including a plurality of circumferentially spaced openings through said outer wall of said liner in each of a pair of axially spaced planes generally perpendicular to said longitudinally extending axis in communication with said first and second fuel injection zones, respectively, said fuel injection means further including a single continuous fuel manifold in said compressed air flow path having first and second integrally interconnected manifold portions each with a respective plurality of openings through which fuel may flow through said openings in said outer wall of said liner into said first and second fuel injection zones, respectively.

2. The annular combustor of claim 1 wherein said openings through said outer wall of said liner are defined by a plurality of open ended elongated air blast tubes adjacent said fuel manifold, said tubes adjacent each of said first and second manifold portions being directed generally tangentially of said first and second fuel injection zones, respectively, said tubes adjacent each of said first and second manifold portions being disposed in said axially spaced planes and each of said tubes having an opening for receiving fuel flowing through the corresponding one of said openings in said fuel manifold.

3. The annular combustor of claim 2 wherein each of said tubes has one end located between said outer wall and said housing in communication with said compressed air flow path and the other end located within said combustion chamber, said opening in each of said tubes comprising a generally radially extending opening in a wall thereof, said openings in said first and second manifold portions each comprising a fuel metering orifice dimensioned smaller than said opening in said wall of the corresponding one of said tubes and said fuel metering orifices each being radially aligned with said opening in the corresponding one of said tubes.

4. The annular combustor of claim 1 wherein said openings through said outer wall of said liner are defined by a plurality of bent tabs formed from portions of said outer wall adjacent said fuel manifold, said bent tabs adjacent each of said first and second manifold portions being directed generally tangentially of said first and second fuel injection zones, respectively, said bent tabs adjacent each of said first and second manifold portions being disposed in said axially spaced planes and each of said openings through said outer wall being adapted to receive fuel flowing through the corresponding one of said openings in said fuel manifold.

5. The annular combustor of claim 1 wherein said fuel manifold includes a fuel inlet line leading from a source of fuel to said first fuel manifold portion, said first fuel manifold portion being generally circular and radially dimensioned for positioning within said compressed air flow path, and includes a connecting branch leading from said first fuel manifold portion to said second manifold portion, said second manifold portion also being generally circular and radially dimensioned for positioning within said compressed air flow path, said openings in said fuel manifold being limited to said first and second fuel manifold portions only.

6. An annular combustor for a turbine engine, comprising:
    a combustor housing including an axially extending sleeve disposed about a longitudinally extending axis;
    an annular liner disposed within said housing and about said sleeve and having concentric inner and outer axially elongated walls, said inner and outer walls being spaced from said sleeve and said housing, respectively, said liner also having a radially extending wall spaced from said housing and interconnecting said inner and outer walls at one end to define a combustion chamber;

said liner being spaced from said housing and said sleeve to define a compressed air flow path therebetween;

means for injecting fuel through said liner in a generally tangential direction into a first fuel injection zone axially adjacent said radially extending wall and into a second fuel injection zone axially adjacent said first fuel injection zone, said fuel injecting means including a plurality of circumferentially spaced openings through said outer wall of said liner in each of a pair of axially spaced planes generally perpendicular to said longitudinally extending axis in communication with said first and second fuel injection zones, respectively, said fuel injection means further including a single continuous fuel manifold in said compressed air flow path having first and second integrally interconnected manifold portions each with a respective plurality of openings through which fuel may flow through said openings in said outer wall of said liner into said first and second fuel injection zones, respectively;

said openings through said outer wall of said liner being defined by a plurality of open ended elongated tubes adjacent said fuel manifold such that said tubes adjacent each of said first and second manifold portions are directed generally tangentially of said first and second fuel injection zones, respectively, said tubes adjacent each of said first and second manifold portions being disposed in said axially spaced planes and each of said tubes having an opening adapted to receive fuel flowing through the corresponding one of said openings in said fuel manifold;

said fuel manifold including a fuel inlet line leading from a source of fuel to said first fuel manifold portion, said first fuel manifold portion being generally circular and radially dimensioned for positioning within said compressed air flow path, and including a connecting branch leading from said first fuel manifold portion to said second fuel manifold portion, said second fuel manifold portion also being generally circular and radially dimensioned for positioning within said compressed air flow path, said opening in said fuel manifold being limited to said first and second fuel manifold portions only.

7. The annular combustor of claim 6 wherein each of said tubes has one end located between said outer wall and said housing in communication with said compressed air flow path and the other end located within said combustion chamber, said opening in each of said tubes comprising a generally radially extending opening in a wall thereof, said openings in said first and second manifold portions each comprising a fuel metering orifice dimensioned smaller than said opening in said wall of the corresponding one of said tubes and said fuel metering orifices each being radially aligned with said opening in the corresponding one of said tubes.

8. The annular combustor of claim 6 wherein said fuel manifold is generally elliptical in cross section with said openings in said first and second fuel manifold portions being disposed along a major axis thereof, and including means for securing said tubes and said fuel manifold to said outer wall of said liner at a point within said compressed air flow path between said outer wall of said liner and said housing.

9. The annular combustor of claim 6 wherein said compressed air flow path extends from a radially outer compressed air inlet in communication with a source of compressed air to a radially inner compressed air outlet in communication with said combustion chamber and including a plurality of circumferentially spaced open ended elongated dilution air tubes extending through said outer wall adjacent said compressed air inlet.

10. The annular combustor of claim 9 wherein said compressed air outlet is axially remote from said radially extending wall, said dilution air tubes being directed generally toward a combustor outlet at the end of said combustion chamber remote from said radially extending wall, said dilution air tubes being adapted to provide dilution air at a point upstream of a turbine nozzle and downstream of said first and second fuel injection zones.

11. An annular combustor for a turbine engine comprising:

a combustor housing including an axially extending sleeve disposed about a longitudinally extending axis;

an annular liner disposed within said housing and about said sleeve and having concentric inner and outer axially elongated walls, said inner and outer walls being spaced from said sleeve and said housing, respectively, said liner also having a radially extending wall spaced from said housing and interconnecting said inner and outer walls at one end to define a combustion chamber;

said liner being spaced from said housing and said sleeve to define a compressed air flow path therebetween;

means for injecting fuel through said liner in a generally tangential direction into a first fuel injection zone axially adjacent said radially extending wall and into a second fuel injection zone axially adjacent said first fuel injection zone, said fuel injecting means including a plurality of circumferentially spaced openings through said outer wall of said liner in each of a pair of axially spaced planes generally perpendicular to said longitudinally extending axis in communication with said first and second fuel injection zones, respectively, said fuel injection means further including a single continuous fuel manifold in said compressed air flow path having first and second integrally interconnected manifold portions each with a respective plurality of openings through which fuel may flow through said openings in said outer wall of said liner into said first and second fuel injection zones, respectively;

said openings through said outer wall of said liner being defined by a plurality of bent tabs formed from portions of said outer wall adjacent said fuel manifold, said bent tabs adjacent each of said first and second manifold portions being directed generally tangentially of said first and second fuel injection zones, respectively, said bent tabs adjacent each of said first and second manifold portions being disposed in said axially spaced planes and each of said openings through said outer wall being adapted to receive fuel flowing through the corresponding one of said openings in said fuel manifold; said fuel manifold including a fuel inlet line leading from a source of fuel to said first fuel manifold portion, said first fuel manifold portion being generally circular and radially dimensioned for positioning within said compressed air flow path, and including a connecting branch leading from said first fuel manifold portion to said second manifold portion, said second manifold portion also being generally circular and radially dimensioned for positioning within said compressed air flow path, said openings in said fuel manifold being limited to said first and second fuel manifold portions only.

12. The annular combustor of claim 11 wherein said openings in said outer wall of said liner have a greater length dimension than width dimension, said bent tabs formed from portions of said outer wall of said liner also having a greater length dimension than width dimension, said bent tabs being disposed at an acute angle to said outer wall of said liner to control the angle of said generally tangential fuel injection.

13. The annular combustor of claim 12 including a compressor adapted to deliver swirl air to said compressed air flow path having a swirl angle of greater than 30 degrees and less than 90 degrees, said openings in said first and second fuel manifold portions directing fuel generally perpendicular of the length dimension of said openings in said outer wall of said liner and generally perpendicular to the direction of travel of said swirl air.

14. The annular combustor of claim 11 wherein said fuel manifold is generally elliptical in cross section with said openings in said first and second fuel manifold portions being disposed along a major axis thereof, and including means for securing said tubes and said fuel manifold to said outer wall of said liner at a point within said compressed air flow path between said outer wall of said liner and said housing.

15. The annular combustor of claim 11 wherein said compressed air flow path extends from a radially outer compressed air inlet in communication with a source of compressed air to a radially inner compressed air outlet in communication with said combustion chamber and including a plurality of circumferentially spaced open ended elongated dilution air tubes extending through said outer wall adjacent said compressed air inlet.

16. The annular combustor of claim 15 wherein said compressed air outlet is axially remote from said radially extending wall, said dilution air tubes being directed toward a combustor outlet at the end of said combustion chamber remote from said radially extending wall, said dilution air tubes being adapted to provide dilution air at a point upstream of a turbine nozzle and downstream of said first and second fuel injection zones.

* * * * *